United States Patent

Seichter et al.

[11] Patent Number: 5,832,399
[45] Date of Patent: Nov. 3, 1998

[54] COMFORT EVALUATING APPARATUS FOR MOTOR VEHICLES WITH MEANS FOR EVALUATING THE LONGITUDINAL ACCELERATION

[75] Inventors: Roland Seichter, Kaufbeuren; Ferit Kuecuekay, Reisen; Ulrich Freyberger, Ingolstadt, all of Germany

[73] Assignee: Bayerische Motoren Werke Aktiengesellschaft, Germany

[21] Appl. No.: 651,280

[22] Filed: May 22, 1996

[30] Foreign Application Priority Data

May 22, 1995 [DE] Germany .................. 195 18 700.8

[51] Int. Cl.$^6$ ............................. G06F 19/00; G01P 15/00
[52] U.S. Cl. .................................. 701/51; 701/70
[58] Field of Search .................. 701/1, 51, 57, 701/70; 477/34, 97

[56] References Cited

U.S. PATENT DOCUMENTS

| | | | |
|---|---|---|---|
| 5,152,192 | 10/1992 | Koenig et al. | 74/862 |
| 5,235,876 | 8/1993 | Minowa et al. | 74/866 |
| 5,282,401 | 2/1994 | Hebbale et al. | 74/866 |
| 5,410,477 | 4/1995 | Ishii et al. | 364/424.01 |

FOREIGN PATENT DOCUMENTS

| | | |
|---|---|---|
| 30 23 646 | 1/1981 | Germany . |
| 42 16 301 | 11/1993 | Germany . |
| 42 26 749 | 2/1994 | Germany . |
| 43 40 289 | 6/1994 | Germany . |
| 43 25 413 | 2/1995 | Germany . |
| 43 28 442 | 3/1995 | Germany . |
| 43 38 073 | 5/1995 | Germany . |

OTHER PUBLICATIONS

"Intelligente Steuerung von Automatikgetrieban durch den Einsatz der Elecktronik," von Ferit Kücükay et al., ATZ Automobilechnische Zeitschrift 96 (1994) pp. 228–235.

*Primary Examiner*—Michael Zanelli
*Attorney, Agent, or Firm*—Evenson, McKeown, Edwards & Lenahan, P.L.L.C.

[57] ABSTRACT

A comfort evaluating apparatus for a motor vehicle with a computer for determining and evaluating the longitudinal acceleration as well as for rating the comfort as a function of characteristics determined for the course of a longitudinal acceleration. The computer evaluates the frequency of flank changes, the acceleration difference between consecutive flank changes and the gradient of the course of the longitudinal acceleration between consecutive flank changes.

12 Claims, 2 Drawing Sheets

COMFORT EVALUATING APPARATUS FOR MOTOR VEHICLES WITH MEANS FOR EVALUATING THE LONGITUDINAL ACCELERATION

BACKGROUND AND SUMMARY OF THE INVENTION

The invention relates to a device for evaluating the comfort of a motor vehicle taking into consideration the longitudinal acceleration of the vehicle, and characteristics determined from the course thereof.

A device of this generic type for evaluating comfort is disclosed, for example, in the ATZ article "Intelligente Steuerung von Automatikgetrieben durch den Einsatz der Electronik" (Intelligent Control of Automatic Transmissions through the Use of Electronics), 4/1994, page 228 ff. This device evaluates characteristics of the course of acceleration of a vehicle during gear-shifting to form a comfort rating comparable to a subjective rating of a gear-shifting procedure, in which the individual characteristics determined are weighted differently. This comfort rating is used, for example, to optimize parameters which influence gear-shifting comfort, such as changes in pressure in the clutches for the subsequent gear changing. In the known comfort evaluating apparatus, the following characteristics of the course of the longitudinal acceleration are determined: the maximum increase in the longitudinal acceleration beyond that which existed before the gear shifting, the maximum decrease in the longitudinal acceleration compared to the level after the gear shifting, and the difference in the longitudinal acceleration before and after the gear shifting procedure. In addition, the derivative of the longitudinal acceleration is also evaluated. The maximum and minimum gradients of the longitudinal acceleration during the gear-shifting procedure are also determined from the derivative of the acceleration and in each case equated to the maximum and minimum gear-shifting shock.

It has been noted experimentally that longitudinal acceleration is clearly the parameter which has the greatest effect on comfort. However, the characteristics determined heretofore do not yet lead to an evaluation of comfort that coincides optimally with an subjective perception of comfort.

It is an object of the invention to provide an optimal comfort evaluation for motor vehicles which adequately reproduces the subjective perception of comfort of motor vehicle passengers.

This object is achieved by the comfort evaluation arrangement according to the invention, which includes sensors for sensing operating parameters whose outputs are evaluated in a data processor to derive a plurality of individual comfort indices. The data processor then weights and combines the individual comfort indices to form an overall comfort rating which is used to adjust comfort affecting operating parameters of the vehicle. The process is repeated iteratively.

According to a feature of the invention, means are provided for evaluating the longitudinal acceleration, from which the frequency of flank changes (that is, changes from increasing to decreasing vehicle acceleration) can be determined as a characteristic, by means of a computer. The number of oscillations in the course of the longitudinal acceleration, particularly within a specified period of seconds, has a strong effect on the perception of comfort.

According to another feature of the invention, the longitudinal acceleration is evaluated to determine the difference in the acceleration in consecutive flank changes. This difference exerts an effect on the subjective perception of comfort to the same extent as does the frequency in flank changes or the number of oscillations.

Finally, in the comfort evaluating system according to the invention, the gradient of the course of the acceleration between consecutive flank changes is also determined as a characteristic. This gradient takes into consideration not only the absolute acceleration difference between two consecutive flank changes, but also the time span during which this acceleration difference occurs. The shorter the time within which the acceleration difference between two consecutive flank changes occurs, the more the perceived comfort deteriorates.

The gradient has been determined to be the most influential characteristic with respect to the perception of comfort. For optimal evaluation of comfort, however, preferably all three characteristics determined, namely the frequency of flank changes, the acceleration difference and the gradient are taken into consideration. In particular, the comfort rating of the individual characteristics can be weighted, as noted previously. For example, an overall comfort rating is calculated by means of the addition of individual weighted comfort ratings formed from the individual characteristics. Any adjustable parameters, which affect comfort, can be changed and adapted in accordance with an overall comfort rating, which has been determined. This adaptation of parameters can be used, for example, in the case of all electronically controlled motor vehicle systems. In addition, it is pointed out that preferably the evaluation of the longitudinal acceleration for rating the comfort can be commenced and ended as an event-controlled or a time-controlled procedure.

Finally, according to another feature of the invention, the amount and/or the algebraic sign of the acceleration difference between the acceleration values at the start and at the end of a specified time span is determined as a characteristic. Preferably, this specified time span is the same as the time span in which the longitudinal acceleration is evaluated for rating the comfort as a function of the characteristics determined (evaluation time).

The means for determining and evaluating the longitudinal acceleration are, for example, sensors and computers, which interact with, or are integrated into, electronic control equipment of the vehicle. Experimental results have shown that the comfort evaluating apparatus according to the invention approaches particularly well the comfort subjectively perceived by the vehicle passengers.

The use of the comfort evaluating apparatus according to the invention in electronic control equipment for automatic transmissions has proven to be particularly effective for adapting comfort-affecting parameters during a gear changing process. When automatic transmissions are used, comfort-affecting parameters, which are adapted in accordance with the inventive comfort evaluation, are, in particular, pressure parameters and time parameters for controlling the clutch as well as the duration and the extent of a reduction in torque during a gear-shifting process. These parameters can, in turn, depend on further parameters, such as the initial transmission rpm, the torque of the internal combustion engine, the transmission temperature, the throttle setting and the rpm of the internal combustion engine.

Other objects, advantages and novel features of the present invention will become apparent from the following detailed description of the invention when considered in conjunction with the accompanying drawings.

DETAILED DESCRIPTION OF THE DRAWING

Figure 1:
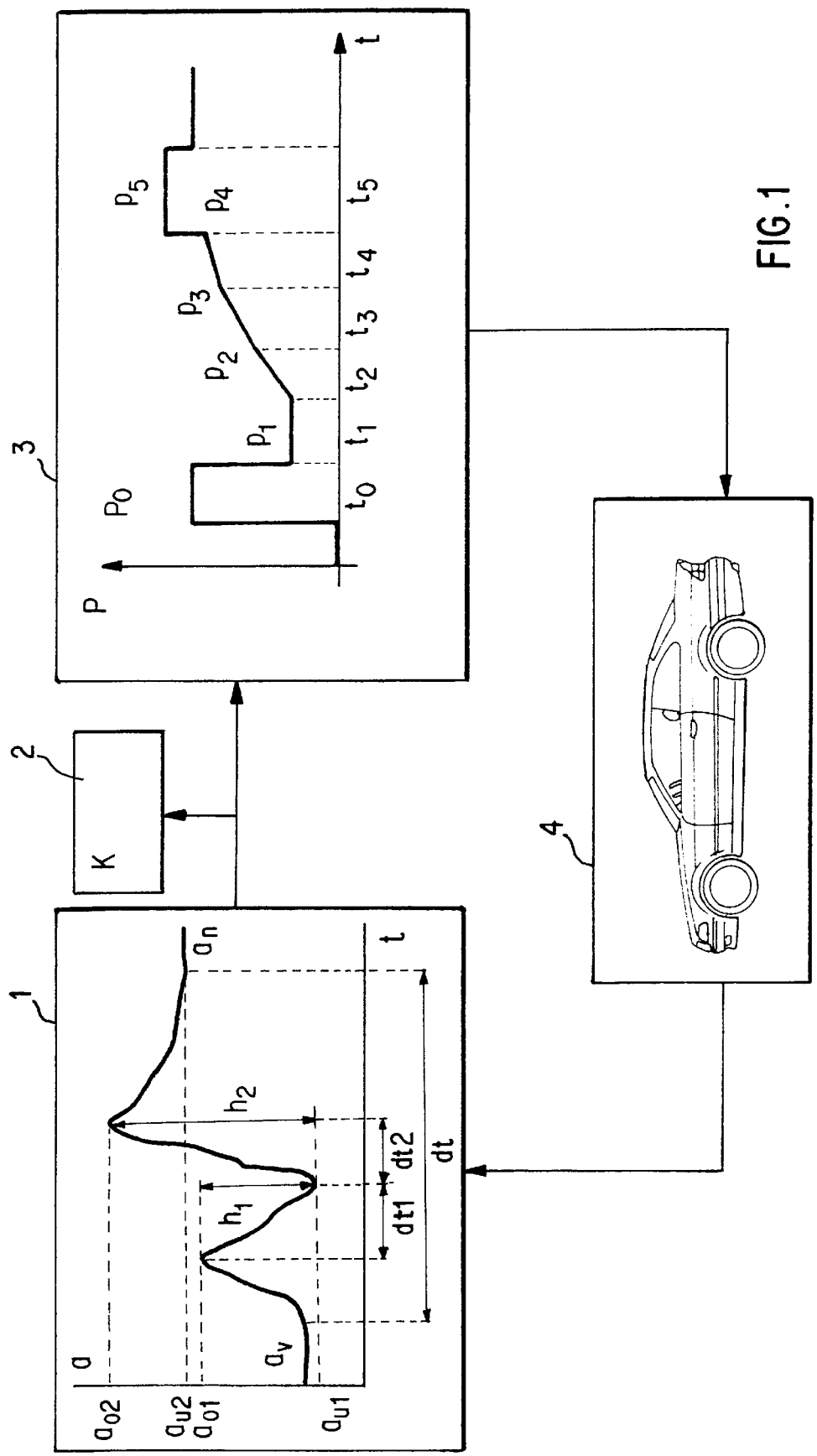
FIG. 1 depicts an embodiment of the invention and shows an inventive comfort evaluation in connection with an adaptation of motor vehicle parameters following therefrom.

FIG. 1 shows a control circuit according to the invention, with a computer 1, a rating unit 2, an adaptation unit 3 and an actuator/sensor apparatus 4. Preferably, the computer 1, the rating unit 2 and the adaptation unit 3 are integrated into an electronic control unit, which may be a programmed data processing unit. The embodiment depicted in the drawing relates to the use of a comfort evaluating apparatus to adapt comfort-affecting parameters P, $p_0$ to $p_5$ for an electronically controlled automatic transmissions.

The longitudinal acceleration of the vehicle is determined by means of the actuator/sensor apparatus 4 and passed on to the computer 1. Since this embodiment evaluates comfort during a gear change the computer 1 stores the longitudinal acceleration of the motor vehicle at least for the time span dt, during which a gear-shifting procedure is being carried out. This time span dt (specified, for example, by a gear-shifting command signal within an electronic control equipment, not shown) can vary, depending on the functions of the transmission control equipment.

A course of the longitudinal acceleration a over time t is recorded in the computer 1. At the start of a gear-shifting process (in this example, a downshifting), the longitudinal acceleration is $a_v$. At the end of the gear-shifting procedure, that is, after the time dt has elapsed, a longitudinal acceleration of $a_n$ is attained. During the time span dt, oscillations, which impair the comfort of vehicle occupants, occur in the course of the longitudinal acceleration a. To evaluate the effect of such oscillations on passenger comfort, the following characteristics are determined from these oscillations for evaluating the comfort:

1. the frequency of flank changes (referred to in the following as "n");
2. the difference between the vehicle acceleration values at the times of two consecutive flank changes, referred to in the following as "h"; and
3. the gradient between two consecutive flank changes, referred to in the following as "h/dt".

As noted previously, a flank change is defined as a change from increasing to decreasing acceleration or vice versa. In the example shown, a first flank change takes place at the longitudinal acceleration $a_{o1}$, a second flank change at the longitudinal acceleration $a_{u1}$ and a third flank change at the longitudinal acceleration $a_{o2}$. Accordingly, in the given time span dt depicted in FIG. 1, the flank change frequency n=3. Between the first and second flank changes, the acceleration difference is $h_1$ and between the second and third flank changes, the acceleration difference is $h_2$. (That is, as noted previously, the acceleration difference $h_1$ is given by the difference between the longitudinal acceleration $a_{o1}$ at the first flank change and the longitudinal acceleration $a_{u1}$ at the second flank change, and the acceleration difference $h_2$ is given by the difference between the longitudinal acceleration $a_{o2}$ at the third flank change and the longitudinal acceleration $a_{u1}$ at the second flank change.)

The gradients between the first and second as well as the second and third flank changes are then determined. The gradient between the first and second flank changes is the ratio of the acceleration difference $h_1$ to the first time span dt1 between the first and second flank changes, while the gradient between the second and third flank changes is the ratio of the acceleration difference $h_2$ to the second time span dt2 between the second and third flank changes.

The frequency of the flank changes (n=3), the acceleration differences $h_1$ and $h_2$ and the gradients $h_1$/dt1 and $h_2$/dt2 are then passed on to the rating unit 2, which determines an overall comfort rating K by weighting and combining the individual comfort ratings. The latter are in turn developed from the frequency of the flank changes, the acceleration differences within the time span dt and the gradients within the time span dt. In forming the overall comfort rating K, advantageously, for example, the individual comfort rating based on the gradients, is weighted more heavily than the individual comfort ratings determined from the frequency of the flank changes or from the acceleration differences. Moreover, the magnitude and algebraic sign of the acceleration difference $a_n - a_v$ between the longitudinal acceleration values $a_n$ and $a_v$ at the start and the end of the given time span dt can also be taken into consideration.

The comfort-affecting parameters P are adjusted in the adaptation unit 3 based on the comfort rating K. Corresponding to the previously determined comfort rating K, parameter values $P_0$ to $p_5$ (such as clutch pressure or time values) are set for each time cycle. The setting is carried out at the motor vehicle by means of the actuator/sensor apparatus 4. The effect on the longitudinal acceleration is thereupon determined once again over the actuator/sensor apparatus 4 and passed on once more to the computer 1.

The following is an example of one possible manner of calculating the overall comfort rating K, corresponding to the known method used in the ATZ Article 4/94, page 230:

The overall comfort rating K, which represents a subjective rating of a shifting operation, is derived as the arithmetic average of individual comfort ratings, weighted according to a suitable optimizing strategy, using empirically determined weighting factors $g_n$, $g_h$ and $g_s$.

$$K = (g_n \times K_n + g_h \times K_h + g_s \times K_s)/(g_n + g_h + g_s)$$

wherein $g_n$ is the weighting factor for the individual comfort rating $K_n$ which is the result of the frequency of the flank changes n; $g_h$ is the weighting factor for the individual comfort rating $K_h$ which is the result of the acceleration differences h ($h_i = h_1$, $h_2$ . . . ); $g_s$ is the weighting factor for the individual comfort rating $K_s$ which is the result of the gradients s ($s_i = h_1$/dt2 . . . ). This calculation of the overall comfort rating K takes place in the rating unit 2.

The individual comfort rating, $K_n$, it should be noted can be determined directly proportionally to the frequency of the flank changes, while the individual comfort ratings $K_h$ and $K_s$ may, in turn, represent mean values of individual comfort ratings for each acceleration difference (here, for example, $h_1$ and $h_2$) or for each gradient (here, for example, $s_1 = h_1$/dt1 and $s_2 = h_2$/dt2).

Figure 2:
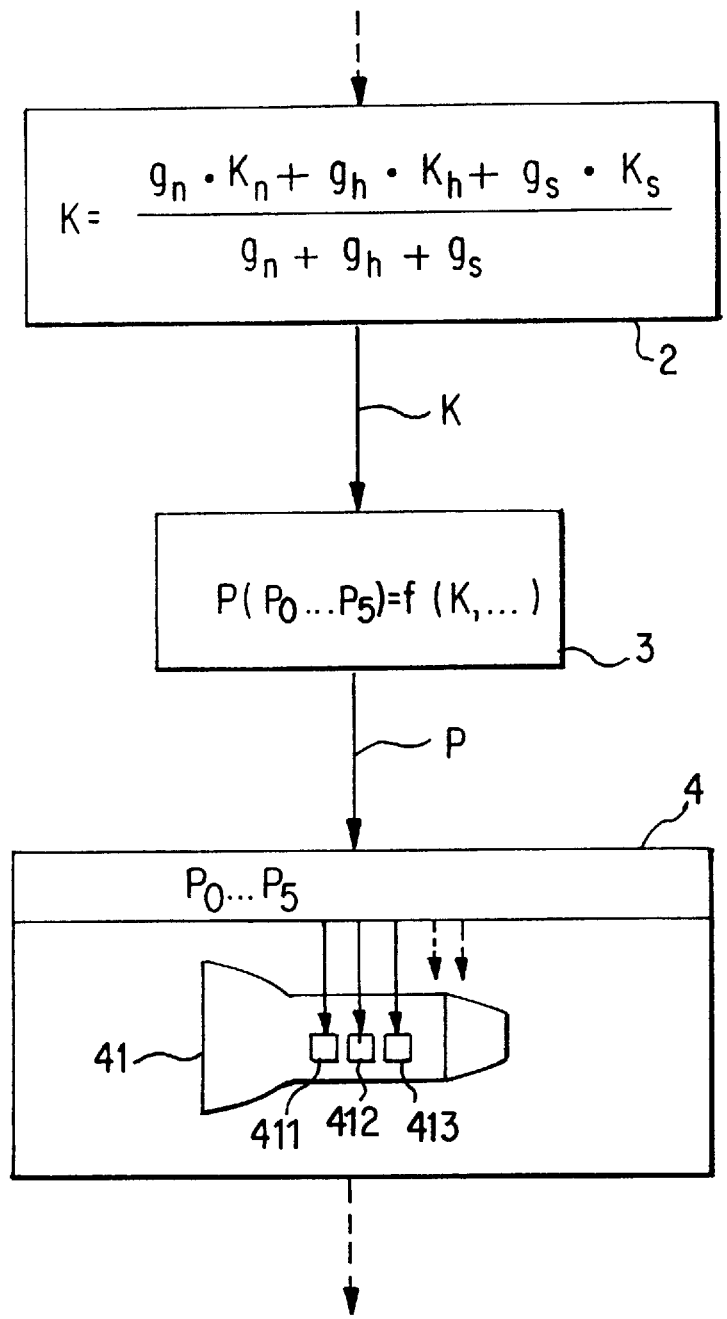
FIG. 2 is a more detailed depiction of the rating unit, the adaptation unit and the actuator sensor apparatus of FIG. 1.

Referring to FIGS. 1 and 2, the overall comfort rating K calculated, for example, in this manner in the rating unit 2 is subsequently transmitted to the adaptation unit 3. The comfort-influencing parameters P or the parameter values $p_0$ to $p_5$ determined for each cycle are determined in the adaptation unit 3, among other things, as a function of the overall comfort rating K. (It should also be noted, however, that these parameters P or $p_0$ to $p_5$, as also described in the ATZ article on page 231, may depend not only on the overall comfort rating K as the parameter, but also on additional parameters, such as the rotational transmission input speed, the engine torque, the transmission temperature, the throttle valve position and the rotational engine speed.) The comfort-influencing parameters P determined in the adaptation unit 3 are transmitted to the actuator/sensor device 4. The comfort-influencing parameters P may particularly be clutch pressure values or time values, whereby, in a known manner, particularly magnetic valves or electric pressure adjusters 411, 412 and 413 of an electronically controlled automatic transmission 41 in a motor vehicle are controlled in a shifting-comfort-optimizing manner.

With this inventive comfort evaluation, on the one hand, the subjective perception of the motor vehicle passengers is taken into consideration optimally and, on the other, it is possible to adapt comfort-affecting parameters relevantly without having to store empirically determined characteristic diagrams in the control unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for evaluating comfort for a motor vehicle, comprising:

a longitudinal vehicle acceleration sensor;

a computer for evaluating characteristics which affect said comfort, based on a course of sensed longitudinal vehicle acceleration;

wherein said computer evaluates a frequency of flank changes in said sensed vehicle acceleration as a characteristic which affects comfort.

2. Apparatus according to claim 1 wherein at least one of an amount and an algebraic sign of an acceleration difference between acceleration at a beginning and at an end of a given time span dt, is determined as a characteristic.

3. Apparatus for evaluating comfort for a motor vehicle, comprising:

a longitudinal vehicle acceleration of said vehicle;

a computer for evaluating characteristics which affect said comfort, based on a course of sensed longitudinal vehicle acceleration;

wherein said computer evaluates acceleration differences between consecutive flank changes in said sensed vehicle acceleration as a characteristic which affects comfort.

4. Apparatus according to claim 3 wherein at least one of an amount and an algebraic sign of an acceleration difference between acceleration at a beginning and at an end of a given time span dt, is determined as a characteristic.

5. Apparatus for evaluating comfort for a motor vehicle, comprising:

a longitudinal vehicle acceleration sensor;

a computer for evaluating characteristics which affect said comfort, based on a course of sensed longitudinal vehicle acceleration;

wherein said computer evaluates a gradient of a course of said sensed longitudinal vehicle acceleration between consecutive flank changes in said sensed longitudinal vehicle acceleration as a characteristic which affects comfort.

6. Apparatus according to claim 5 wherein at least one of an amount and an algebraic sign of an acceleration difference between acceleration at a beginning and at an end of a given time span dt, is determined as a characteristic.

7. Apparatus for evaluating comfort for a motor vehicle, comprising:

a longitudinal vehicle acceleration sensor;

a computer for evaluating characteristics which affect said comfort, based on a course of sensed longitudinal vehicle acceleration;

wherein said computer evaluates at least one of the following as a characteristic which affects comfort: a frequency of flank changes between consecutive flank changes, acceleration differences between consecutive flank changes, and a gradient of a course of said sensed longitudinal vehicle acceleration between consecutive flank changes.

8. Apparatus according to claim 7, wherein said computer comprises means for combining said characteristics to form an overall comfort rating value.

9. Apparatus according to claim 4, wherein said combining includes a weighting of respective characteristics.

10. Apparatus for controlling an automatic transmission of a vehicle, comprising:

a longitudinal vehicle acceleration sensor;

a computer for evaluating characteristics which affect said comfort, based on a course of sensed longitudinal vehicle acceleration, said characteristics comprising at least one of the following as a characteristic which affects comfort: a frequency of flank changes between consecutive flank changes, acceleration differences between consecutive flank changes, and a gradient of a course of said sensed longitudinal vehicle acceleration between consecutive flank changes; and means for adjusting comfort affecting parameters of said transmission during a gear shifting thereof, based on said characteristics.

11. Apparatus according to claim 10, wherein said computer comprises means for combining said characteristics to form an overall comfort rating value.

12. Apparatus according to claim 11, wherein said combining includes a weighting of respective characteristics.

* * * * *